United States Patent
Bauer et al.

(10) Patent No.: US 6,751,603 B1
(45) Date of Patent: Jun. 15, 2004

(54) AUTOCOMPLETE METHOD AND APPARATUS FOR DATA FILE SELECTION

(75) Inventors: Mathias Bauer, Hamburg (DE); Lutz Höger, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/572,717

(22) Filed: May 16, 2000

(51) Int. Cl.[7] .............................................. G06F 17/30
(52) U.S. Cl. .................... 707/1; 707/3; 707/6
(58) Field of Search .............................. 707/1, 2, 3, 4, 707/10, 100, 6; 345/700; 709/203

(56) References Cited

U.S. PATENT DOCUMENTS

| | | | | |
|---|---|---|---|---|
| 5,357,431 A | * | 10/1994 | Nakada et al. | 715/531 |
| 5,774,713 A | * | 6/1998 | Yokota | 707/1 |
| 5,819,261 A | * | 10/1998 | Takahashi et al. | 707/3 |
| 5,832,471 A | * | 11/1998 | Fukui | 707/1 |
| 5,890,147 A | * | 3/1999 | Peltonen et al. | 707/1 |
| 6,003,043 A | * | 12/1999 | Hatakeyama et al. | 707/203 |
| 6,119,133 A | * | 9/2000 | Nusbickel et al. | 707/205 |
| 6,229,535 B1 | * | 5/2001 | Tokuda | 345/339 |
| 6,239,802 B1 | * | 5/2001 | Lahey et al. | 345/352 |
| 6,335,746 B1 | * | 1/2002 | Enokida et al. | 345/839 |

\* cited by examiner

*Primary Examiner*—Srirama Channavajjala
*Assistant Examiner*—Cheryl Lewis
(74) *Attorney, Agent, or Firm*—Gunnison, McKay & Hodgson, L.L.P.; Forrest Gunnison

(57) ABSTRACT

A method for identifying one file in a plurality of files facilitates a user rapidly selecting the file. In an input operation, at least one character that was input by a user is received. In a find file operation, the method compares an input character string that is, or that includes, the at least one character with each individual data file name of a plurality of data file names. The find file operation identifies individual data files names that include a character string that corresponds to, i.e., matches, the input character string. A send to display operation sends at least one of the identified individual data file names to a display unit, which in turn displays the sent information to the user, i.e., suggests an individual data file name to the user. If the user accepts the suggested individual data file name via one input order action forwarded, the selected file is processed as desired by the user. Alternatively, the user can scroll through the identified individual data file names and selected the desired file, or input another character in which case the autocomplete process is automatically repeated.

20 Claims, 6 Drawing Sheets

AUTOCOMPLETE METHOD AND APPARATUS FOR DATA FILE SELECTION

BACKGROUND OF THE INVENTION

1. Field of the Invention

The invention relates generally to data file retrieval, and in particular to a method for easily and quickly selecting a data file, which is stored on a memory of a computer system.

2. Description of Related Art

In computer systems, regularly many data files have to be organized. These data files may be stored in the memory of the computer system, including any external memories accessible by the computer system. The mere number of data files in such a computer system may render the selection of a particular data file time consuming, in particular, if the exact name of the desired data file is not known to the user of the computer system. To accelerate and facilitate the process of finding data files in a computer system, different methods are known in the prior art.

The most common approach is simply to type in the data file name and, if necessary, also the directory of the desired data file via a suitable input device, for example, a keyboard Since each data file has a certain name and is stored in a certain directory in a storage medium of a computer system, this search is successful, if the data file with the chosen name actually exists in any of the searched directories. This search may be facilitated if the data file names were chosen in a logic order, which may reflect the content of the data file, the date of creation or any other information useful for identification, as well as by an advantageous organization of the data files, that means by arranging the data files in the various directories in the light of certain logic or practical criteria, like adherence to a certain project. This option to search for a data file by hand may become time consuming if the exact name of the data file is not known and several data files, which may be even in different directories, exist which have similar names.

Another possibility to find the requested data file employs a tree, representing the hierarchical structure of the directories and of the data files organized therein. Here, the user may find the desired data file using a mouse or a keyboard, connected to the I/O interface of the computer system, by clicking through the structure and finally clicking on the desired data file representation. Finding a certain data file may be easier here, if the data files are properly organized in a tree-like structure as described. If, however, the data files are not arranged in a comprehensible logic order, the tree-scheme is only of limited help.

Another solution to quickly retrieve several data files is to retrieve the data files last opened or amended, for example, the five last opened data files. This method offers practical advantages, but only if the user worked on a few data files in a short period of time.

In addition, several computer systems offer the user a search function for data files. Here, the user has the possibility to specify the requested data file by giving, for example, a part of the name, the directory, the subdirectory, the kind of data file, the date of storing, or a combination of some of these parameters. Based on such search criteria, the search function searches for the requested data file and presents all data files corresponding to this description. Although these functions allow an improved search, they lack user friendliness in that they require significant activities of the user to eventually select the desired data file.

Finally, prior art software is known which allows a user to search in a computer system for a certain data file by typing in the first few letters of the data file's name at a command line prompt and then hitting a predefined key, e.g., the tab key, to start the search. Thee computer system compares the available data file names with the typed in letters. If the first few letters of a data file's name and the typed in letters correspond, the complete data field is displayed and the cursor is moved to the end of the name. None of the name is selected, e.g., highlighted. If this is the correct data file, the user can select the file by depressing, for example, the enter key.

If there are several potentially requested data files, only one of them is selected, by some decision scheme, and displayed. To display a different data file name that matched, the user hits a predefined key, for example, e.g., again hits the "tab" key. Once this conditional user input has been delivered, the system automatically displays the next data file that matched. If this choice is not the desired data file, the user can hit the predefined key again, or can manually delete the selected name, or at least a part thereof, and then type in another character and hit the predefined key again to start another search. This model for finding data files is, therefore, in many cases inconvenient. In addition, it is not possible to use this method from within an application.

SUMMARY OF THE INVENTION

According to the principles of this invention, a method for selecting a data file with an individual data file name from a plurality of data files each having an individual data file name eliminates the shortcomings of the prior art. In particular, the method results in the suggestion of an individual data file name based upon a character or character string input by the user. The information added to the character or character string input by the user is automatically selected, e.g., highlighted, in the display. If the user wishes to select the suggested data file, the user performs a predefined input action. Alternatively, the user can view other matches with the input character or character string, terminate the search, or input another character.

If the user elects to view other matches, i.e., rejects the first suggested individual data file name, the next matching data file name is displayed. Again, the information added to the input character or character string is automatically selected, e.g., highlighted in the display. If the user wishes to select the next suggested data file, the user performs the predefined input action.

If at this time the user inputs another character, i.e., rejects the next matching data file name, the selected portion of the next matching data file name is replaced in the display by the characters input by the user and the method of this invention automatically, without further user input, autocompletes the data file name.

In one embodiment, the method receives a string of at least one character, and compares the string of at least one character with each of the individual data file names of a plurality of data files to identify individual data file names having characters in a predefined location in the data file name corresponding to, i.e., matching, the user input string of at least one character. The method sends at least one of the identified individual data file names to a display unit, and receives an acceptance or rejection of the suggested individual data file name made via one input order action by the user. The rejection can result in the automatic display of the next matching data file name, or the automatic initiation of a new search depending on the type of the one input rejection order.

In one embodiment, all of the identified individual data file names are sent to the display unit. The user has the option of viewing each of the identified individual data file names and accepting or rejecting each of the identified individual data file names via one input order. Optionally, all of the identified individual data file names comply with at least one filtering criterion such as a data file type. Alternatively, at least two of the identified individual data file names are sent to the display unit in an order determined by a listing function. In one embodiment, the listing function determines the display order according to the date of last handling of the data files corresponding to the identified individual data file names.

The invention includes a memory having an autocomplete process stored therein. Upon execution of the autocomplete process, the autocomplete process includes: receiving a string of at least one character, comparing the string of at least one character with each of the individual data file names of a plurality of data files to identify individual data file names corresponding in their first characters to the string of at least one character, sending at least one of the identified individual data file names to a display unit wherein upon display of the at least one of the identified individual data file names as a suggested individual data file name, a portion of the at least one of the identified individual data file names different from the string of at least one character is selected, and receiving an acceptance or rejection of the suggested individual data file name made via one input order action.

In one embodiment, one rejection input order action results in the display of another identified individual data file name, and upon display of the another identified individual data file name, a portion of the another identified individual data file name different from the string of at least one character is selected. This portion is the part of the data file name that is not included in the input character string.

Also, the stored autocomplete method is transferred from the memory to another memory in a another device. In one embodiment, the transfer comprises a download over a communications network.

The invention also includes a computer system includes: means for receiving a string of at least one character, means for comparing the string of at least one character with each of the individual data file names of the plurality of data files to identify individual data file names corresponding in their first characters to the string of at least one character, means for sending at least one of the identified individual data file names to a display unit wherein upon display of the at least one of the identified individual data file names as a suggested individual data file name, a portion of the at least one of the identified individual data file names different from the string of at least one character is selected, and means receiving an acceptance or rejection of the suggested individual data file name made via one input order action.

The method of this invention can be implemented in a wide variety of computer systems including a client-server system. Alternatively, the processor and the memory are in a first device, and the display and input unit are for a second device different from the first device.

BRIEF DESCRIPTION OF THE DRAWINGS

Herein, elements with the same reference numeral are the same element.

DETAILED DESCRIPTION

According to the principles of this invention, a method for identifying one file in a plurality of files facilitates a user rapidly selecting the file. Moreover, this file identification method is included, in one embodiment, within an application such as a word-processing application, or a spreadsheet application. This data file autocomplete method provides a new level of performance that requires minimal user input to quickly and efficiently select a data file. As explained more completely below, a data file is used to represent any file structure of interest in a computer system.

Figure 2:
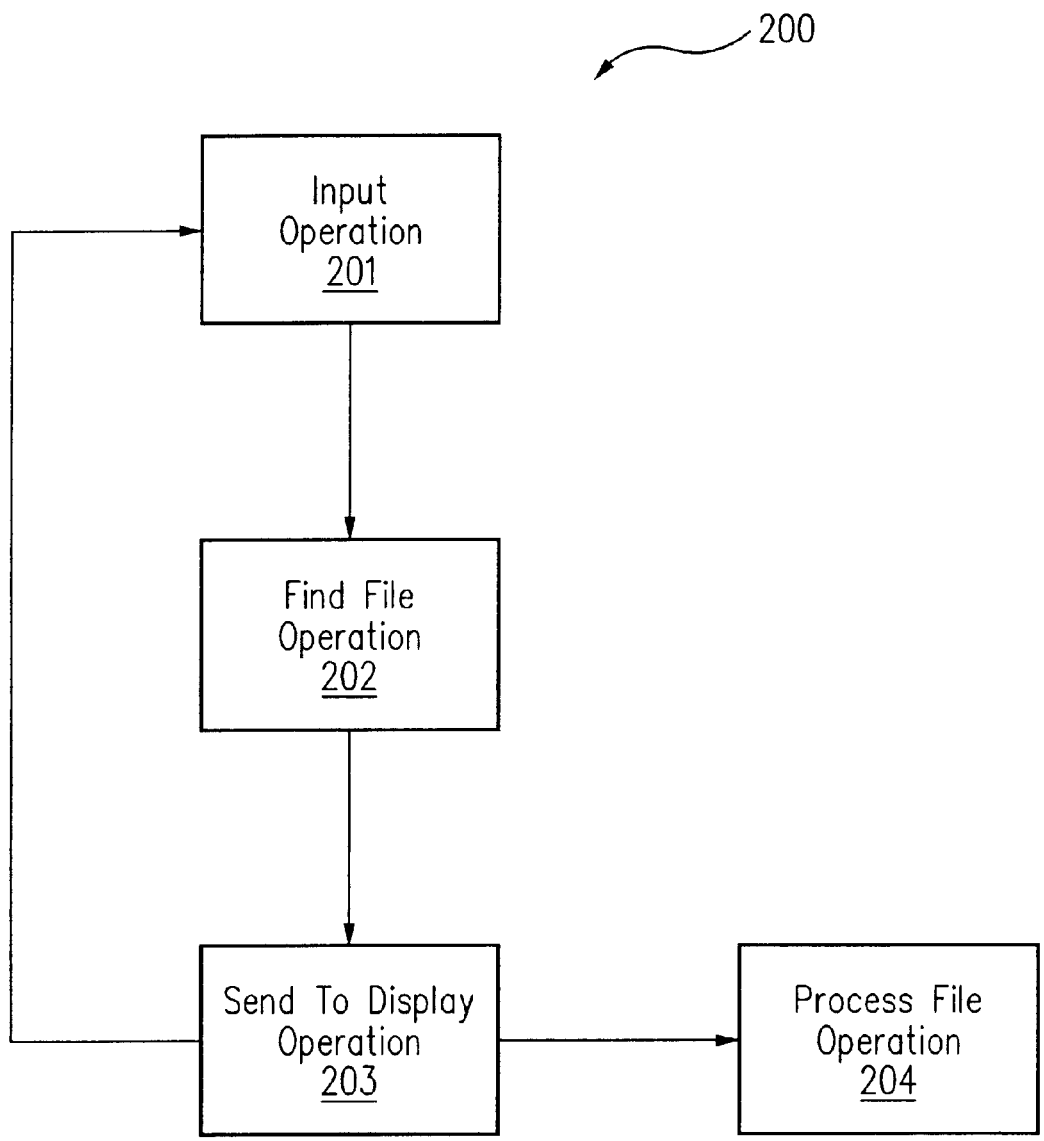
FIG. 2 is a high-level process flow diagram of one embodiment of the autocomplete method for data file selection according to the principles of this invention.

In method 200 (FIG. 2.) in input operation 201, at least one character that was input by a user is received in computer system 100 via I/O interface 115 from one of a plurality of I/O devices 116 to 121, e.g., keyboard 116, or from over network 122. Upon receipt of the at least one character, input operation 201 transfers to find file operation 202.

As explained more completely below, in find file operation 202, method 200 compares an input character string that is, or that includes, the at least one character with each individual data file name of a plurality of data file names. Here, the operations in find file operation 202 are considered when the user has stopped inputting characters. Preferably, as explained more completely below, method 200 is executed using multiple threads where a new thread is launched each time the user inputs a new character.

Here, the plurality of data files 113 is shown stored in a memory 110 of computer system 100 where each data file has a unique data file name. However, this is illustrative only and is not intended to limit the invention. In another embodiment, the plurality of data files includes data files that are accessible by computer system 100 over network 122, as described more completely below.

Operation 202 identifies individual data files names that include a character string that corresponds to, i.e., matches, the input character string. Upon completion of find file operation 202, processing transitions to send to display operation 203.

Initially, send to display operation 203 sends at least one of the identified individual data file names to a display unit, which in turn displays the sent information to the user, i.e., suggests an individual data file name to the user, with a portion of the at least one of the identified individual data file names different from the input character string selected, e.g., highlighted. This can be done either on display unit 117 or alternatively on a display unit coupled to computer system 100 by network 122. If the user accepts the suggested individual data file name via one input order action forwarded via I/O interface 115 and received by method 200, processing transfers to process file operation 204, in which the selected file is processed in a manner appropriate for the state of the application in which method 200 is included, e.g., the selected file is saved, opened, moved, copied, or perhaps deleted.

If the user does not accept the suggested data file name, i.e., rejects the suggested data file name, the user can scroll through other individual data file names that matched the input character string in send to display operation 203. However, if there were a large number of matches, the user may prefer to narrow the number of matches by entering another character. If the user issues other than either a display control command or the accept command, processing transfers from send to display operation 203 to input operation 201, and process 200 is repeated for a new input string that includes a plurality of characters.

Hence, as explained more completely below, method 200 allows a user to quickly and efficiently locate a data file. The user rejects a suggested matching data file name by simply inputting a predefined action to move to another matching data file name.

Alternatively, the user can reject all the matching data file names by inputting another character. In this case, the selected portion of the suggested matching data file name is replaced by the newly input character and the matching operation is automatically repeated without any additional user input to complete the data file name.

Moreover, method 200 can be used to construct a complete data path so that the user does not have to manually open and close multiple directories searching for a particular data file. In particular, the data file name can include directory names, and so the user cycles through method 200 to generate a complete data file name that includes a directory and any subdirectories. Herein, when method 200 is said to accomplish or cause an act, those of skill in the art will understand that this refers to executing method 200 on a processor, which in turn causes the processor to issue signals that result in the stated act.

Data files according to the present invention are understood to be an accumulation of information organized within memory 110 of computer system 100. These data files may include any information like, for example, text, tables, pictures, sound or programs. Also, memory 110 may include any suitable storage medium for the data files, for example, a hard disk, a floppy disk, a CD-ROM, magnetic tape, flash memory, random access memory, or any other suitable memory.

Further, those of skill in the art will appreciate that while memory 110 is illustrated as one unit that includes volatile memory 111 and non-volatile memory 112, in most computer systems, memory 110 is implemented as a plurality of memory units. In more general terms, autocomplete method 200 is stored in a computer readable medium, and when autocomplete method 200 is loaded from the computer readable medium into a memory of a device, the device is configured to be a special purpose machine that executes autocomplete method 200.

Figure 1A:
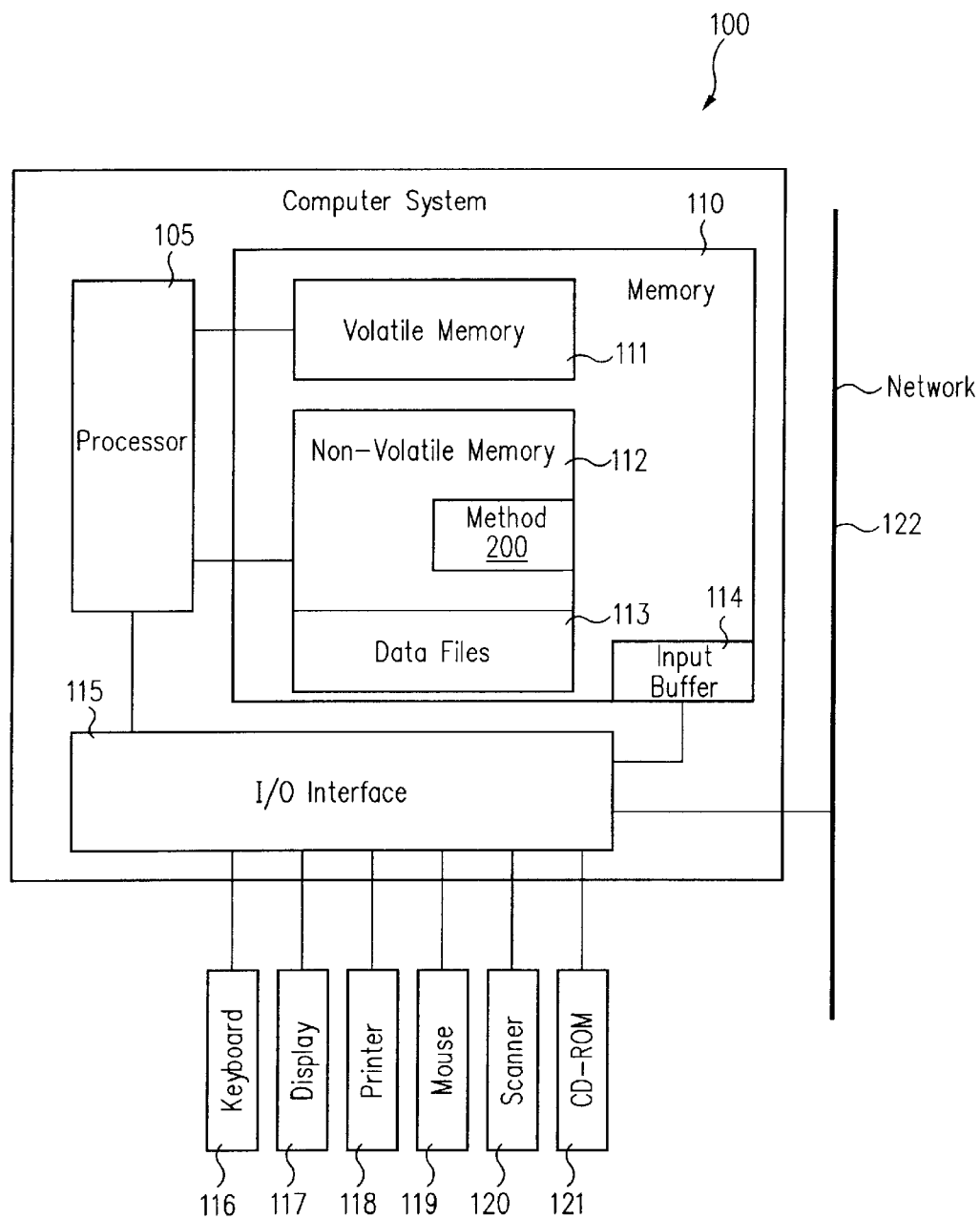
FIG. 1A is a high-level block diagram of a computer system that includes an autocomplete method for data file selection according to the principles of this invention.

This storage medium may belong to computer system 100 itself as illustrated in FIG. 1A, but the storage medium may as well be external to computer system 100 and may be connected to computer system 100 via a data line or a network 122.

The data files are regularly organized in directories and subdirectories. Each data file has an individual name, which consists of a sequence of characters. Individual means that there is no other data file with the same name in the same directory. Characters are all signs, including letters, numbers and symbols, which can be used for identifying a data file. Depending on the particular implementation of computer system 100, the name of the data file may have to meet certain restrictions, like a limited number of characters or a limitation to specific characters. The sequence of characters building the name may, but need not, have a meaning.

The reason for selecting a particular data file is not essential to this invention. The data file may be selected to perform various processing functions on the date file, for example, to save it, to edit it, to open it, to copy it, to delete it, to send it, or for any other purpose.

Also, in the context of the present invention, computer system 100 may also comprise a server and a client, which share the above described tasks of the computer system among themselves. For example, the plurality of data files may be stored on the server, which may also carry out operation 202. However, the string of characters input by the user may be first received by the client, for example, a laptop or handheld computer or a mobile phone, i.e., operation 201 is carried on the client. After operation 202 is carried out on the server, information can be transmitted to the client, which also suggests the identified data file name or names on the display of the client. Alternatively, the server may suggest the identified file name and only the display operation is carried out on the client. In view of this disclosure, those of skill in the art can appropriate the tasks between a client and a server to achieve the best performance of method 200 for the given configuration.

Figure 1B:
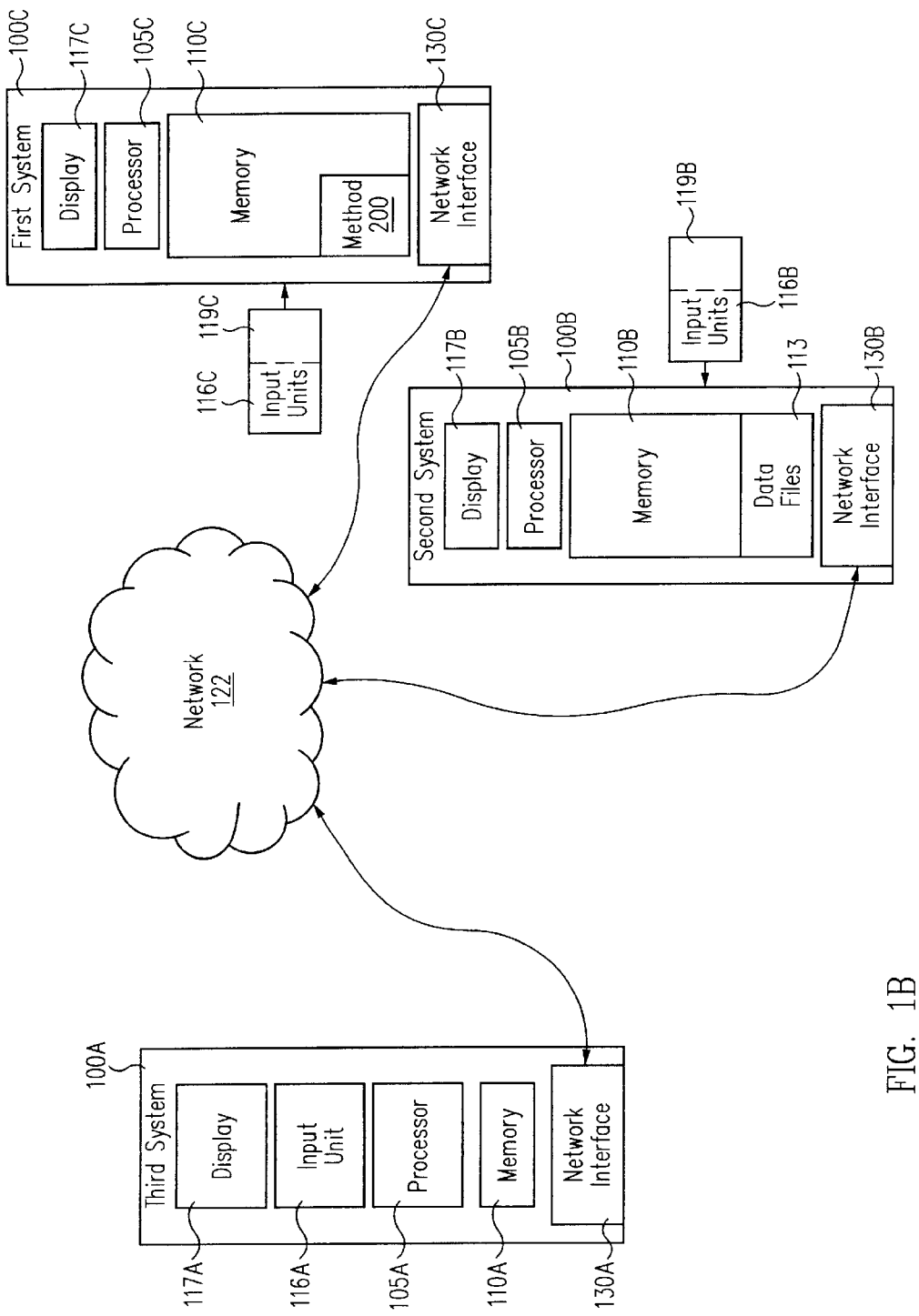
FIG. 1B is a high-level block diagram where the computer system of FIG. 1A is distributed among a plurality of devices that are interconnected via a network.

More specifically, computer system 100, in one embodiment, can be a portable computer, a workstation, a two-way pager, a cellular telephone, a digital wireless telephone, a personal digital assistant, a server computer, or any other device that includes the components shown and that can execute method 200. Similarly, in another embodiment, computer system 100 can be comprised of multiple different computers, wireless devices, cellular telephones, digital telephones, two-way pagers, or personal digital assistants, server computers, or any desired combination of these devices that are interconnected to perform autocomplete method 200 as described herein. See, for example, FIG. 1B.

Accordingly, a computer memory refers to a volatile memory, a non-volatile memory, or a combination of the two in any one of these devices. Similarly, a computer input unit and a display unit refers to the features providing the required functionality to input the information described herein, and to display the information described herein, respectively, in any one of the aforementioned or equivalent devices.

In addition, memory 110 may be physically located in a location different from processor 105. The only requirement is that processor 105 is coupled to memory 110. This could be accomplished in a client-server system, or alternatively via a connection to another computer via modems and analog lines, or digital interfaces and a digital carrier line. For example, memory 110 could be in a World Wide Web portal, while display unit 117 and processor 105 are in a personal digital assistant (PDA), or a wireless telephone. Conversely, display unit 117 and at least one of the input devices could be in a client computer, a wireless telephone, or a PDA, while memory 110 and processor 105 are part of a server computer on a wide area network, a local area network, or the Internet.

In view of this disclosure, method 200 can be implemented in a wide variety of computer system configurations. In addition, method 200 could be stored as different modules in memories of different devices. For example, method 200 could initially be stored in a server computer, and then as necessary, a module of method 200 could be transferred to a client device and executed on the client device. Consequently, part of method 200 would be executed on the server processor, and another part of method 200 would be executed on the client device. In view of this disclosure, those of skill in the art can implement the invention in a wide-variety of physical hardware configurations using an operating system and computer programming language of interest to the user.

Moreover, while in FIG. 1A, data files 113 are shown as part of the same memory 110 as the memory storing autocomplete method 200, those of skill in the art will understand that this is illustrative only. Data files 113, in one embodiment, are in a first memory 110B (FIG. 1B) that is coupled to a second memory 110C containing autocomplete method 200 via a network connection. For example, data files 113 are on a memory of computer 100B, which could be, for example, a file server, while autocomplete method 200 and processor 105 are located in another computer 100C, which could be, for example, a workstation 100C. Computers 100B and 100C are coupled via network 122. Alternatively, data files 113 are in a first memory 110C in first system 100C, autocomplete method 200 is in another memory 110B in a second system 100B, and processor 105 can be in either first system 100C, second system 100B, or a third system 101A that is different from the first and second systems. The particular configuration of memory 110 used to support autocomplete method 200 is not essential to this invention.

Figure 1C:
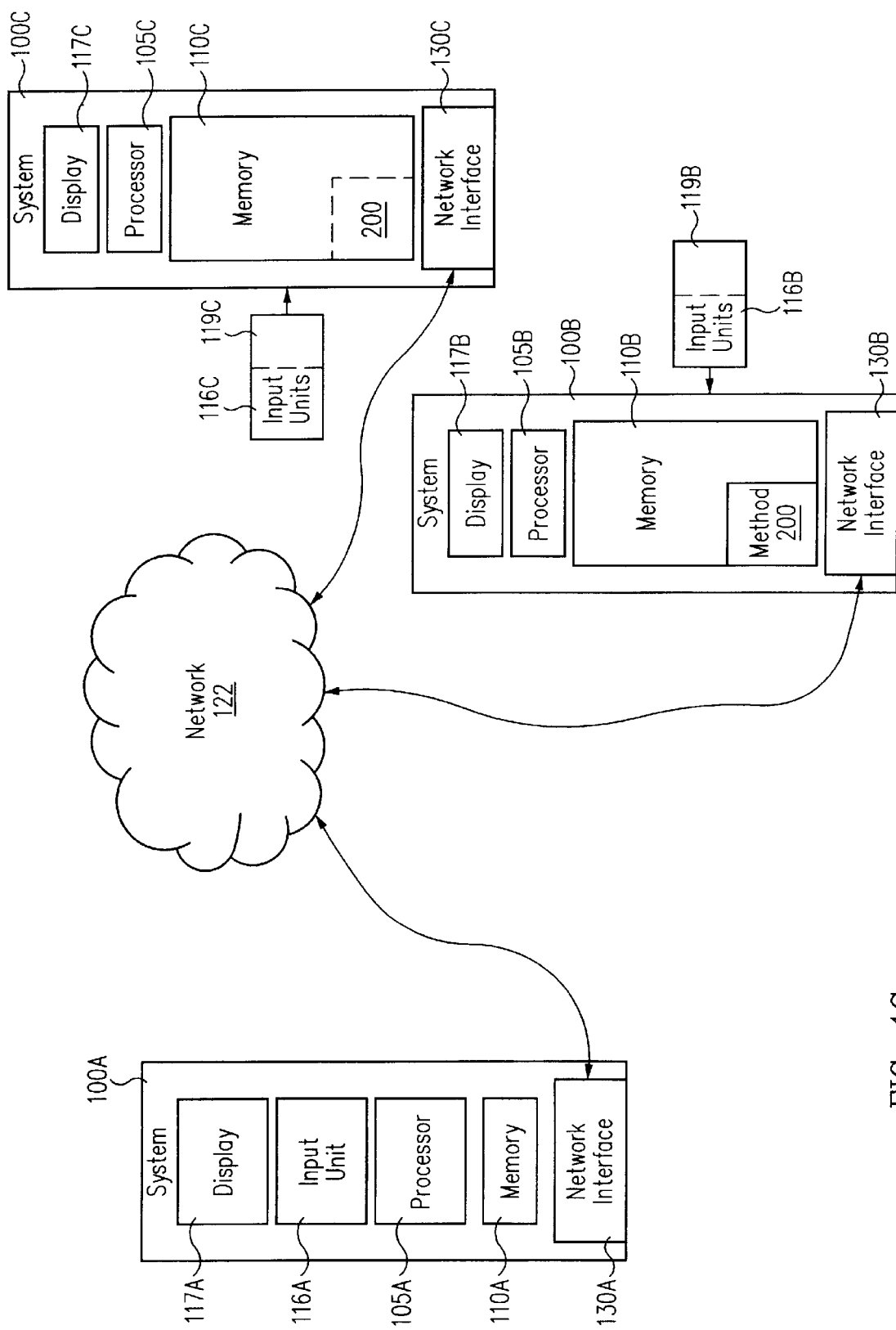
FIG. 1C is a high-level block diagram where the computer system of FIG. 1A is distributed among a plurality of devices, and the autocomplete method of this invention is transferred from a memory in a first device to a memory in a second device.

In yet another embodiment illustrated in FIG. 1C, autocomplete method 200 is stored in memory 110 of system 10B. Stored autocomplete method 200 is transferred, over network 122 to memory 110C in system 100C. In this embodiment, network interfaces 130B and 130C can be analog modems, digital modems, or a network interface card. If modems are used, network 190 includes a communications network, and autocomplete method 200 is said to be downloaded.

In the present invention, the data file names may also include directory names and names of storage media. This can be advantageous, if the user wants to select a directory or a storage medium as well as if the user wants to search through hierarchical levels, for example, from the name of the storage medium via the names of directories and subdirectories to the name of the data file to be selected.

Figure 3:
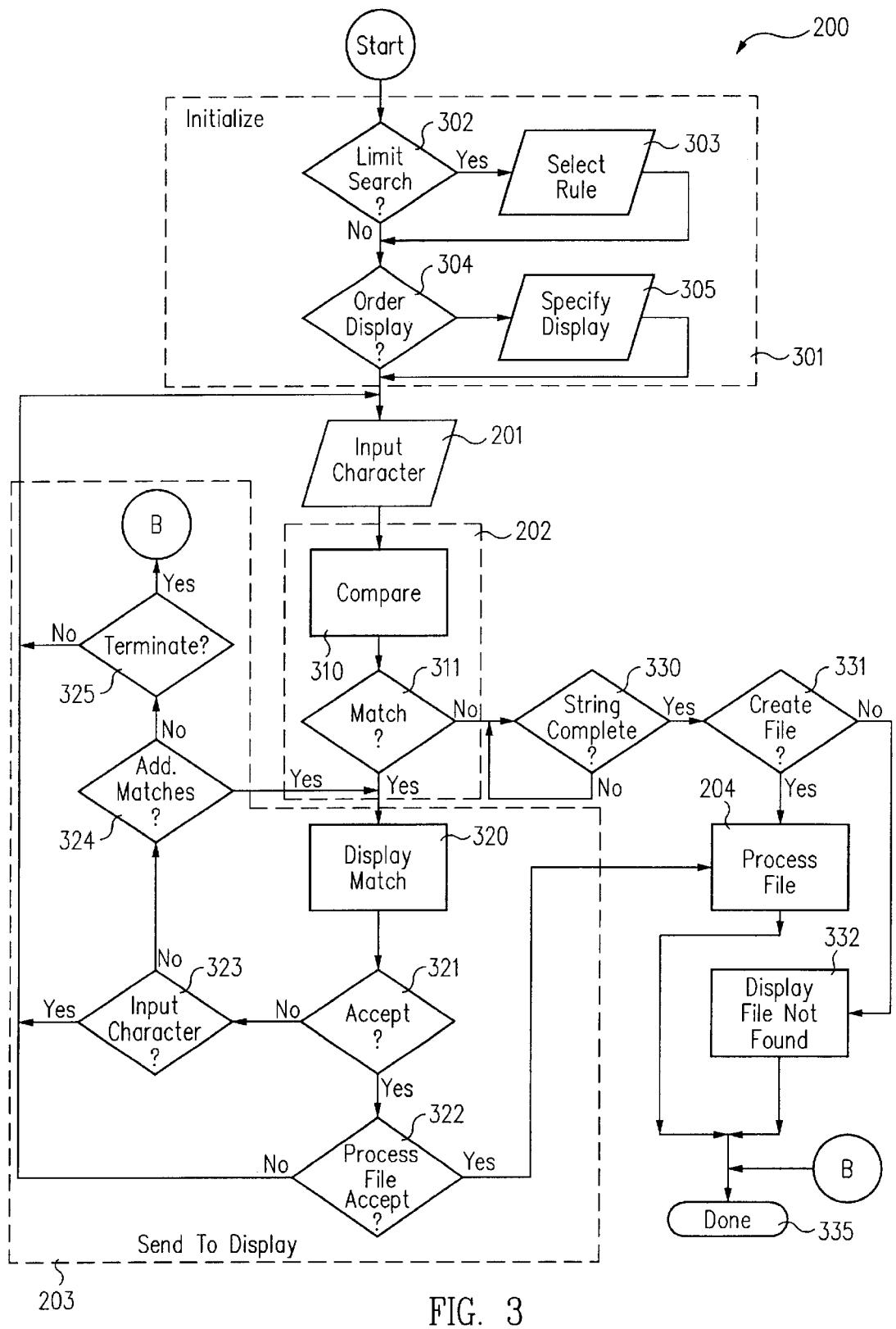
FIG. 3 is a more detailed process flow diagram of another embodiment of the autocomplete method for data file selection according to the principles of this invention.

FIG. 3 is a process flow diagram for one embodiment of method 200 of this invention. Upon entry to method 200, an optional initialization operation 301 is performed. If initialization operation 301 is included in method 200, operation 301 is configured by a user, and that configuration is used for each subsequent execution of method 200 until the user elects to change the configuration. Consequently, operation 301 would not be executed each time method 200 is used. Consequently, FIG. 3 is illustrative only and is not intended to limit the invention to the specific process sequence illustrated. In view of this disclosure, method 200 can be implemented in a wide variety of ways.

In initialization operation 301, the user is presented with an interface in limit search check operation 302 that asks the user whether the user wants to limit the file search. If the user response is yes, processing transfers to select rule operation 303.

In this embodiment, plurality of data files 113 may be all data files in a certain directory, all data files on a certain storage medium or any other group of data files selected by any practical rule. Select rule operation 303 allows the user to specify the plurality of data files 113 that are utilized in method 200. For example, a rule may specify that only names of certain types of data files may be used in method 200. Such rules can also determine how exact the search is, for example, if the search differs between capital and small characters or if the search considers or disregards the existence of a space between the characters. Also, the user could use a rule to specify the location in the data file name that is matched with the input character string. For example, the user could select between a rule that matched the characters at the start of the data file name, or a rule that matches the characters at the end of the data file name. Alternatively, the match could be performed at a specified location within the data file name, e.g., starting with the sixth character from the start of the name. Herein, it is assumed that the match is with the corresponding characters at the start of the data file name.

Alternatively, a rule can specify a filter criterion or criteria. The number of displayed data file names can be reduced if only the identified individual data file names are displayed, which comply with at least one filtering criterion applied by a filter. For example, a filter may include data file information beside the data file name, like the data file type, the date of saving, and the last user of the data file. If the inventive method is used, for example, during an opening process of a document application, one filtering criterion is the data file type, e.g., document or spreadsheet.

If the user does not select one or more rules in operation 303, all data files on computer system 100 are searched. Alternatively, if the user selects one or more rules in select rule operation 303, the plurality of data files used in method 200 includes only those data files that satisfy each rule specified in select rule operation 203. In another embodiment, the user is provided the option of specifying logical relations, such as AND, OR, NOT, among the rules. For purposes of an example, assume that the user selects a rule that limits the search to the data files on one particular hard disk drive 112 in computer system 100.

If the user chooses not to limit the search, or when operation 303 completes, processing transfers to order display check operation 304 in initialize operation 301. If the user selects to order the display, processing transfers from check operation 304 to specify display operation 305, and otherwise to input operation 201.

To simplify the decision between at least two identified individual data file names, the data files may be, for example, displayed in an order determined by a listing function. Such an order may be, for example, the order according to the date of last handling of the data files corresponding to the identified individual data file names. In addition, the listing function can control how many data file names are displayed at one time. For example, at least two data file names are displayed in an order determined by the listing function. Thus, the user can specify the number of data file names listed and the sequence in which that number of data file names are listed. Hence, in specify display operation 305, the user selects one or more listing functions that control how the identified individual data file names are presented to the user. Operation 305 also transfers to input operation 201.

In the above description, the display filtering and the file search filtering have been separated for clarity. However, those of skill in the art will appreciate that the filtering could be integrated in a wide variety of ways without departing from the inventive method. Moreover, in one embodiment, the user selections are optional.

As explained above, in input operation 201, the user is prompted to enter an input character in computer system 100. In most situations, method 200 starts in input operation 201. Specifically, to select a data file, a user of computer system 100 informs the computer system about at least the first character of a path name of the data file, or alternatively, the first character of the name of the data file itself. This may be performed by pressing the corresponding key on keyboard 116 connected via I/O interface 115 or by using a mouse 119, a microphone or any other input device connected to computer system 100.

In this example, the user wants to open a well-known document stored in a certain subdirectory of hard disk drive 112. To open the desired document, the user types in the first character in the name of the desired directory. If the name of the desired directory is, for example, "patents," the user types in the character "p". The character "p" is stored in an input buffer 114, and processing transfers to find file operation 202.

Compare operation 310 in operation 202 compares the one character in input buffer 114 with all data file names on non-volatile memory 112. This includes, in this example, all data files and all directories, but not the subdirectories or the data files which are stored under these directories. The comparison is made, of course, between the same number of characters. For example, if three characters are stored in input buffer 114, these three characters are compared to the first three characters of the data file name of each data file belonging to the above mentioned plurality of data files.

Figure 4:
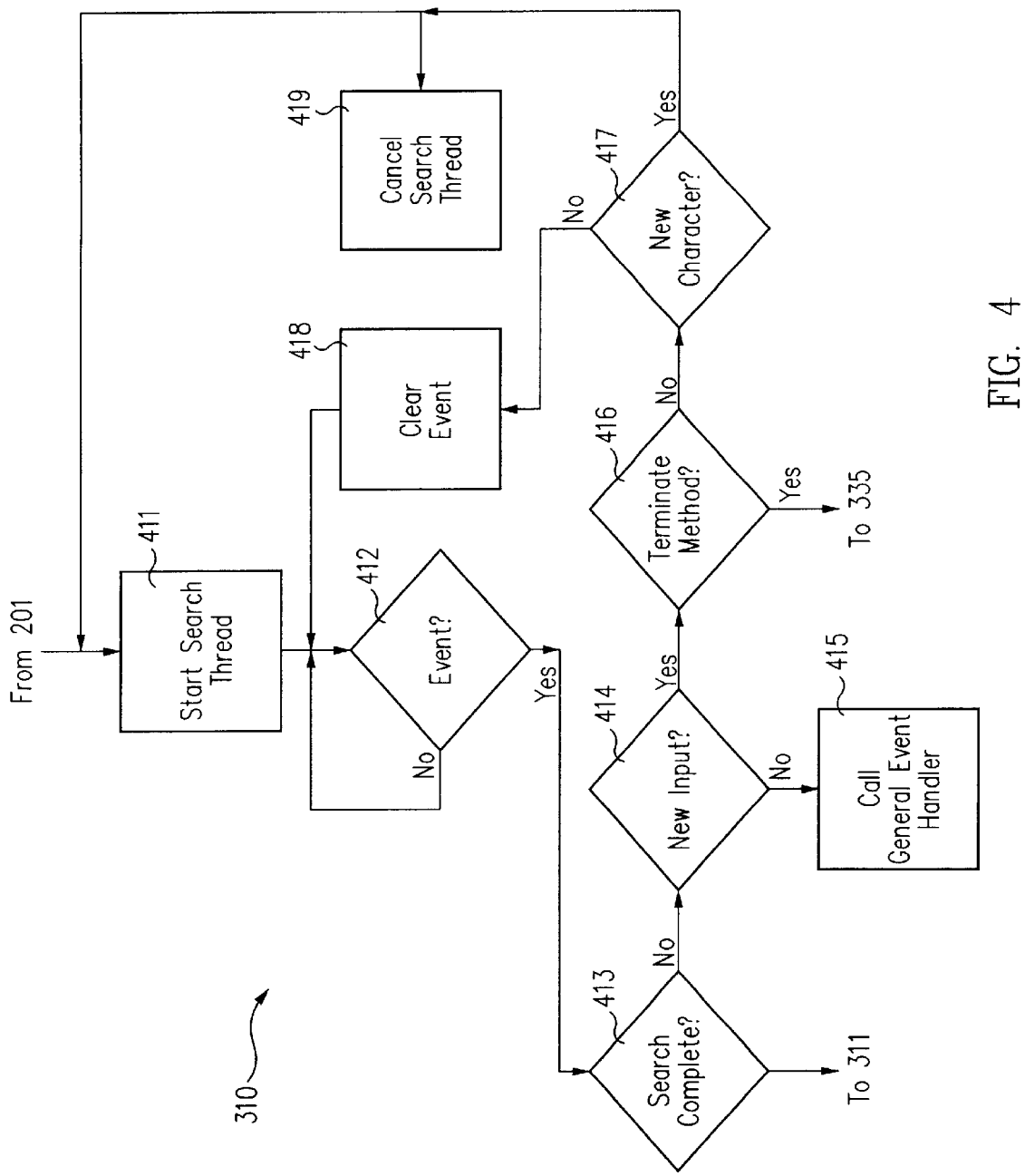
FIG. 4 is a more detailed process flow diagram of the compare operation in FIG. 3 that illustrates one embodiment of the multi-threading used in the invention.

FIG. 4 is a more detailed process flow diagram of one embodiment of compare operation 310 that illustrates the multi-threading capability of one embodiment of this invention. Upon input of a character and initiation of compare operation 310, start search thread operation 411 initiates a thread that starts to search for data file names including the character or character string input by the user. After operation 411 is initiated, processing transfers to event check operation 412 while the thread executes.

Processing of method 200 effectively idles until an event occurs. Upon an event occurrence, an event handler is executed to process the event. In FIG. 4, for convenience this is illustrated as a linear sequence of actions. As is known to those of skill in the art, an event handler typically determines the cause of the event and then executes instructions that handle the particular event. This can be implemented in a number of ways. Therefore, the sequence in FIG. 4 is illustrative only and is not intended to limit the invention to the linear sequence of actions illustrated.

Operation 411 transfers to search complete check operation 413. If the thread searching for matches to the input character string has completed execution, check operation 413 transfers to match check operation 311, which is described below. If the event was not a thread execution completion, search complete check operation 413 transfers processing to new input check operation 414.

If the user has input information for method 200 via an input device, check operation 414 transfers to terminate method check operation 416 and otherwise to general event handler operation 415, which handles the event appropriately. If the user provided an input order action that indicates the user wants to terminate execution of method 200, check operation 416 transfers to done operation 335 that is explained more completely below.

If the user input order action is other than a method termination request, processing transfers from check operation 416 to new character check operation 417. New character check operation 417 determines whether the user has input another character. If the input order action is other than a character or a terminate method request, it is assumed that the input order action is unintentional, and so new character check operation 417 transfers to clear event operation 418, which takes any action necessary to clear the event and returns processing to event check operation 412.

If the user has input a new character, new character check operation 417 transfers to start search thread 411 operation and to cancel search thread operation 419. To provide responsive performance, in this embodiment, as soon as the user inputs another character a new search thread with the new character string is started by operation 411. Cancel search thread operation 419 terminates the previous search thread that was started by operation 411.

According to the method of the present invention, compare operation 310 searches for all names on hard disk drive 112, which start with the character "p". Assuming that compare operation 310 identifies one or more names and the user does not enter another character, match check operation 311 transfers to display match operation 320 within send to display operation 203.

In display match operation 320, all directory names and file names, which were identified in compare operation 202 as starting with the character "p" are first sorted in an order according to the date of last handling of the directories and names. Recall, that the user is assumed to have selected this listing function.

Next display match operation 320, sends data to a user interface, or sends data over network 112 to a user interface on a client device, and the user interface displays the name of the data file or directory, which starts with the character "p," and which has been handled most recently. If the directory "projects" was the one, which has been handled as the last, the user interface displays this name and selects "rojects". Otherwise, the name of another directory or data file is displayed.

In general, as the result of compare operation 202, a number of data file names may be identified which start with the input string of a least one character. Display match operation 320 sends data to a display unit that upon being displayed suggests one of the identified data file names and selects a portion of the suggested data file name that is different from the user input character or character string. The suggested data file name can be displayed on any desired display unit, including but not limited to a screen, a voice output, or any other device for informing the user about a suggested data file name. This display does not necessarily have to be part of the device executing method 200. For example, the display may be part of a remote client, whereas the device executing method 200 is a central server. (See FIG. 1B.) It is also possible, for example, that the computer system or a connected device, like a client, in addition informs the user about the identified data file names via a loudspeaker connected to the computer system.

Depending on the displayed data file name, the user decides if this is the desired data file, i.e., the user accepts or rejects the offered name. Hence, acceptance check operation 321 determines whether the user input an acceptance of the suggested data file name. The acceptance or rejection of a suggested data file name is effected, according to the present invention, by one input order action. This means that one input order action, for example, pressing the "enter" key or the "end" key, is carried out to accept a suggested name. Any other input order action, e.g., hitting another character key, is a rejection of the suggested name.

In the case the data file or directory is the wrong one, the user may reject the displayed, i.e., suggested, data file name. The rejection can be made, for example, by inputting a further character, e.g., the character "a". Since the input character is not one of the acceptance input order actions, acceptance check operation 321 transfers to input character check operation 323.

Since the user has input a character, input character check operation 323 transfers to input operation 201, which replaces the selected portion of the displayed data file name with the character "a". The user only has to perform a single input operation to change the search criteria and to initiate automatically a new search. There is no need to delete or modify the displayed name prior to hitting another key to initiate another search.

This time compare operation 310 compares the data file names with the new character string in the input buffer, and now identifies only those data files and directories that start with "pa". Alternatively, the identified data file names from the initial pass through process 200 could be saved and only the saved identified file names are used in further narrowing searches. Assuming that compare operation 310 identifies one or more data file names, which start with the character string "pa," match check operation 311 transfers to display match operation 320 within send to display operation 203.

In display match operation 320, all directory names and file names, which were identified in compare operation 202 as starting with the character string "pa" are first sorted in an order according to the date of last handling of the directories and names. Recall, that the user is assumed to have selected this listing function.

Next, display match operation 320 sends the data to the user interface, or sends the data on network 112 to a user interface on a client and the user interface displays the name of the data file or directory, which starts with the character "pa," and which has been handled most recently. If the directory "patents" was the one, which has been handled as the last, the user interface displays this name with "tents" selected. Otherwise, the name of another directory or data file is displayed. Since directory "patents" is the desired directory, the user gives the acceptance input order action for a directory, e.g., hits the end key, so that the selected material is accepted and the cursor is moved to the end of the suggested data file name. Acceptance check operation 321 transfers processing to process file acceptance check operation 322.

According to the principles of this invention, in this embodiment, there are two possible acceptance input orders, the first is an order to accept a directory name, e.g., hit the "end" key in which case autocomplete method 200 can be used to find either a subdirectory or a data file within the directory. The second is an order to accept a data file name for processing, e.g., hit the "enter" key, in which case the autocompletion is done, and the accepted data file is processed.

Hence, process file acceptance check operation 322 determines which of the two possible acceptance input orders was issued by the user. If the user depressed the "enter" key, the user has accepted the data file name for processing and so check operation 322 transfers to process file operation 204 that is described below.

In this example, the user wants to open the text document "claims" in the subdirectory "patents". Consequently, the input acceptance action was a directory acceptance. Consequently, the cursor is moved to the end of "patents" and the selection of "tents" is dropped.

Processing returns to input operation 201 in which the user inputs a directory delimiter, e.g., a slash or, perhaps, a back slash. In response to the new character input, start search thread operation 411 initiates a search for "patents\", and transfers to event check operation 412.

Since the user immediately inputs the character "c" after inputting the "\", processing transfers from check operation 412 through check operations 413, 414, and 416 to new character check operation 417. Since the user input a new character, check operation 417 transfers to start search thread operation 411 that initiates another search thread for "patents\c" and cancel search thread operation 419 cancels the search thread for "patents\".

Hence, compare operation 310 automatically starts a new comparison with the new character string and compares the new character string "c" with all data file names in subdirectory "patent" on storage medium 112. This includes, in this example, all data files and all directories, but not the subdirectories or the data files which are stored under this subdirectory. Assuming that compare operation 310 identifies one or more names, match check operation 311 transfers to display match operation 320 within send to display operation 203.

In display match operation 320, all directory names and file names with directory "patents", which were identified in compare operation 202 as starting with the character "c" are first sorted in an order according to the date of last handling of the directories and names. Recall, that the user is assumed to have selected this listing function.

Depending on the names of the data file and subdirectories in the accepted subdirectory, the user may have to input more then one character and inventive method 200 is carried out several times. After the name of the desired data file, in this example the text document "claims", has been suggested in display match operation 320, and the user has accepted this data file name by pressing the enter key on the keyboard 116, process file acceptance check operation 322 transfers to process file operation 204.

In process file operation 204, the file named "claims" is processed in a text processing application. In general, when an actual data file, and not a directory or subdirectory is accepted, the corresponding data file is processed by computer system 100, e.g., computer system 100 can save, open, move, copy, or take any other desired operation on the data file. Alternatively, as explained more completely below, a new data file is created in operation 204. Therefore, opening a file is illustrative only and is not intended to limit the invention to only such an operation. After the data file is selected by the user, computer system 100 processes the selected data file.

Regularly, in method 200, the user has to input at least two or three characters until the user interface displays the name of the desired directory or data file. In view of the above description, the processing performed by method 200 is apparent when a plurality of characters is used. Moreover, input operation 201 could be configured so that processing did not transfer to compare operation 202 until after a predefined number of characters were entered into input buffer 114 by the user.

In the above embodiment of method 200, it was assumed that the user sorted the identified data file names to suggest the more recently used file. However, in another embodiment, all or a selected number of the identified individual data file names are sent to a display unit in display match operation 320. Furthermore, any of the displayed individual data file names may be accepted. This allows the user to search for and select the right data file without inputting a unique string of characters.

If, for example, a group of data files names differs only in their last characters, the user may only input the first characters to display the group of names. Based on the displayed data file names, the user can accept the desired data file name using any suitable input device such as, a keyboard, a mouse, a touch screen, or a microphone and appropriate language recognition and conversion software.

In this embodiment, if the user neither accepts a displayed data file name nor inputs another character, acceptance check operation 321 transfers to input character check operation 323 that in turn transfers to additional matches check operation 324. If there are additional matches that have not yet been suggested and the user hit a cursor control key, additional matches check operation 324 transfers to display match operation 320 that in turn causes the next data file name that matched the character string in input buffer 114 to be displayed with a portion of the data file name, which was not in the input character string, selected.

Conversely, if there are not further matches or if the user hit other than a character key or a cursor control key, check operation 324 transfers to terminate check operation 325. If the user hit a key that indicates the user wants to discontinue the search operation, terminate check operation 325 transfers to done 335, which is described below, and otherwise to input operation 201.

Notice that while several checks are done to determine the user's response, in each case only a single input action by the user was required. Moreover, method 200 permits the user to simply and efficiently build a complex directory path with single input actions.

Specifically, to select a data file by searching through the directories, method 200 may be carried out several times. If the desired data file is stored, for example, in a certain subdirectory of a certain storage medium, the user may first input characters corresponding to the name of the storage medium and accept the displayed storage medium by depressing the end key, if it is correct. The same will take place for the directory name, the subdirectory name, and at the actual data file name, the user presses the "enter" key to accept the data path built using this method.

In another embodiment of the present invention, in display match operation 320, a structure in which at least the identified data files are shown in their hierarchical order is sent to a display unit in addition to the suggested data file name. This may simplify the selection, since the user can see the organization of the data files graphically. The user may employ the structure in connection with, for example, a mouse to input a directory or a file name. In such an embodiment, the user may highlight a data file name in the displayed structure. This highlighting may be interpreted as an input of the corresponding characters as well as an acceptance of the respective data file.

In the above description, it was assumed that compare operation 310 found one or more matches to the character or character string in input buffer 114. However, if no match is found, match check operation 311, in the embodiment of FIG. 3, transfers to string complete check operation 330 and the autocomplete operation is actually done. In another embodiment, check operation 311 can transfer directly to display file not found operation 322, or alternatively directly to done 335.

Assuming match check operation 311 transfers to string complete check operation 330, when the user has entered a complete character string, check operation 330 transfers to create file check operation 331. If method 200 is configured to create a new file, check operation 330 automatically transfers to process file operation 204, which in this case creates a new data file. Alternatively, create file check operation 331 can ask the user whether the user wants a new file opened and then transfer to process file operation 204, or to display file not found operation 332. Both operation 204 and operation 332 transfer to done 335, which performs any necessary clean up and terminates method 200.

The method of the present invention may be implemented in a computer program, including comprehensive office applications such as the programs of Lotus, Microsoft and StarOffice. Such a computer program may be stored on any common data carrier, like, for example, a floppy disk or a compact disk (CD), as well as on any common computer system's storage facilities, like hard disks. Therefore, the present invention also relates to a data carrier for storing a computer program for carrying out the inventive method. The present invention also relates to a method for using a computer system for carrying out the presented inventive method. The present invention further relates to a computer system with a storage medium on which a computer program for carrying out the presented inventive method is stored.

It will be understood that the inventive method is not limited to this example and that those skilled in the art can use this method in all kinds of computer applications.

We claim:

1. A method for selecting a data file with an individual data file name from a plurality of data files each having an individual data file name, said method comprising:

receiving a string of at least one character, comparing said string of at least one character with each of said individual data file names of said plurality of data files to identify individual data file names corresponding in their first characters to said string of at least one character, sending at least one of said identified individual data file names to a display unit wherein upon display, said at least one of said identified individual data file names is a suggested individual data file name, and a portion of said at least one of said identified individual data file names is selected, and receiving an acceptance or rejection of said suggested individual data file name made via one input order action.

2. The method according to claim 1, wherein all of said identified individual data file names are sent to said display unit and any of said displayed individual data file names may be accepted or rejected wherein said user issues a rejection input order action to view a next identified individual data file name.

3. The method of claim 1, further comprising sending another of said identified individual data file names to said display unit wherein upon rejection of said suggested individual data file name, said another of said identified individual data file names is suggested, and a portion of said another of said identified individual data file names different from said string of at least one character is selected.

4. The method according to claim 1, wherein all of said identified individual data file names comply with at least one filtering criterion.

5. The method according to claim 4, wherein said filtering criterion is a data file type.

6. The method according to claim 1, wherein at least two of said identified individual data file names are sent to said display unit in an order determined by a listing function.

7. The method according to claim 6, wherein said listing function determines said order according to the date of last handling of said data files corresponding to said identified individual data file names.

8. The method according to claim 1, wherein said individual data file names include directory names.

9. The method according to claim 1, wherein a structure is sent to said display unit in which at least said identified data files are shown in their hierarchical order.

10. The method of claim 1, wherein said acceptance or rejection is rejection, and further wherein said method further comprises receiving another character and combining said another character with said string of at least one character to form a new string in response to said one input order action.

11. The method of claim 10, further comprising repeating said comparing, sending, and receiving operations using said new string.

12. The method of claim 1, wherein said comparing is multi-threaded.

13. A memory having an autocomplete process stored therein, wherein upon execution of the autocomplete process, the autocomplete process comprises:
receiving a string of at least one character,
comparing said string of at least one character with each of said individual data file names of a plurality of data files to identify individual data file names corresponding in their first characters to said string of at least one character,
sending at least one of said identified individual data file names to a display unit wherein upon display of the at least one of said identified individual data file names as a suggested individual data file name, a portion of said at least one of said identified individual data file names different from said string of at least one character is selected, and
receiving an acceptance or rejection of said suggested individual data file name made via one input order action.

14. The memory of claim 13, wherein said stored autocomplete method is transferred from said memory to another memory.

15. The memory of claim 14, wherein said transfer comprises a download over a communications network.

16. The memory of claim 13, wherein said autocomplete method further comprises sending another of said identified individual data file names to said display unit wherein upon rejection of said suggested individual data file name, said another of said identified individual data file names is suggested, and a portion of said another of said identified individual data file names different from said string of at least one character is selected.

17. A computer system comprising:
means for receiving a string of at least one character,
means for comparing said string of at least one character with each of said individual data file names of said plurality of data files to identify individual data file names corresponding in their first characters to said string of at least one character,
means for sending at least one of said identified individual data file names to a display unit, wherein upon display of said at least one of said identified individual data file names, said at least one of said identified individual data file names is a suggested individual data file name, and
means for receiving an acceptance or rejection of said suggested individual data file name made via one input order action.

18. A system comprising:
a processor; and
a memory having an autocomplete method stored therein, wherein upon execution of the autocomplete method, the autocomplete method comprises:
receiving a string of at least one character,
comparing said string of at least one character with each of said individual data file names of said plurality of data files to identify individual data file names corresponding in their first characters to said string of at least one character,
sending at least one of said identified individual data file names to a display unit, wherein upon display of said at least one of said identified individual data file names, said at least one of said identified individual data file names is a suggested individual data file name, and
receiving an acceptance or rejection of said suggested individual data file name made via one input order action.

19. The system of claim 18, wherein said system is a client-server system.

20. The system of claim 18, wherein said processor and said memory are in a first device, and said display and input unit are for a second device different from said first device.

* * * * *